United States Patent
Lee et al.

(10) Patent No.: US 10,688,927 B2
(45) Date of Patent: Jun. 23, 2020

(54) INTELLIGENT ULTRASONIC SYSTEM AND REAR COLLISION WARNING APPARATUS FOR VEHICLE

(71) Applicant: HYUNDAI MOBIS CO., LTD., Seoul (KR)

(72) Inventors: Kyu Hoon Lee, Ansan-si (KR); Ji Su Kim, Yongin-si (KR); Jang Yeol Yoon, Suwon-si (KR); Dong Soo Park, Seoul (KR); Jin Young Oh, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 16/049,638

(22) Filed: Jul. 30, 2018

(65) Prior Publication Data

US 2019/0031100 A1  Jan. 31, 2019

(30) Foreign Application Priority Data

Jul. 28, 2017 (KR) .................. 10-2017-0095857
Aug. 18, 2017 (KR) .................. 10-2017-0104683

(51) Int. Cl.
*B60Q 9/00* (2006.01)
*B60T 7/22* (2006.01)
(Continued)

(52) U.S. Cl.
CPC .............. *B60Q 9/008* (2013.01); *B60T 7/22* (2013.01); *B60T 8/17* (2013.01); *G01S 7/52006* (2013.01);
(Continued)

(58) Field of Classification Search
CPC ........... B60T 2201/022; B60T 2201/10; B60T 2210/32; B60T 2230/08; B60T 7/22;
(Continued)

(56) References Cited

U.S. PATENT DOCUMENTS 6,405,132 B1* 6/2002 Breed .................... G01S 15/88
                                                      701/301
9,612,123 B1* 4/2017 Levinson ............. G05D 1/0274
(Continued)

FOREIGN PATENT DOCUMENTS

KR    2001-0016962 A    3/2011
KR    10-1734490 B1     5/2017

*Primary Examiner* — Atul Trivedi
(74) *Attorney, Agent, or Firm* — Knobbe Martens Olson & Bear LLP

(57) ABSTRACT

An intelligent ultrasonic system may include: a camera sensor unit configured to take an image of a road ahead of a driving vehicle; an ultrasonic signal input unit configured to receive an ultrasonic signal sensed through one or more ultrasonic sensors mounted on the vehicle; a feature extraction unit configured to extract a feature of the received ultrasonic signal; a data collision unit configured to collect one or more data related to a surrounding situation of the road on which the vehicle is driven; and a control unit configured to divide the surrounding situation into two or more classes based on the one or more data collected through the data collection unit, and change or reset an existing parameter to a parameter corresponding to any one class of the classes when the surrounding situation corresponds to the one class or is changed to the one class.

19 Claims, 7 Drawing Sheets

(51) Int. Cl.

| | | |
|---|---|---|
| *G01S 15/931* | (2020.01) | |
| *G01S 7/539* | (2006.01) | |
| *B60T 8/17* | (2006.01) | |
| *G01S 13/00* | (2006.01) | |
| *G01S 15/87* | (2006.01) | |
| *G01S 7/52* | (2006.01) | |
| *G01S 7/527* | (2006.01) | |
| *G01S 15/86* | (2020.01) | |
| *B60W 30/09* | (2012.01) | |
| *G01S 13/86* | (2006.01) | |
| *G01S 13/931* | (2020.01) | |

(52) U.S. Cl.
CPC .............. *G01S 7/527* (2013.01); *G01S 7/539* (2013.01); *G01S 13/00* (2013.01); *G01S 15/86* (2020.01); *G01S 15/87* (2013.01); *G01S 15/931* (2013.01); *B60T 2201/022* (2013.01); *B60T 2201/10* (2013.01); *B60T 2210/32* (2013.01); *B60T 2230/08* (2013.01); *B60W 30/09* (2013.01); *B60W 2554/00* (2020.02); *G01S 13/867* (2013.01); *G01S 2013/9322* (2020.01); *G01S 2013/9323* (2020.01); *G01S 2013/9324* (2020.01); *G01S 2013/93271* (2020.01); *G01S 2013/93272* (2020.01); *G01S 2013/93274* (2020.01); *G01S 2013/93275* (2020.01); *G01S 2015/938* (2013.01); *G01S 2015/939* (2013.01)

(58) Field of Classification Search
CPC ........ B60T 8/17; G01S 7/52006; G01S 7/527; G01S 7/539; G01S 13/00; G01S 13/867; G01S 15/025; G01S 15/87; G01S 15/931; G01S 2013/9357; G01S 2013/9364; G01S 2013/9367; G01S 2013/9375; G01S 2013/9378; G01S 2013/9385; G01S 2013/9389; G01S 2015/938; G01S 2015/939; B60Q 9/008; B60W 30/09; B60W 2550/10

USPC .......................................................... 701/93

See application file for complete search history.

(56) References Cited

U.S. PATENT DOCUMENTS

| | | | | |
|---|---|---|---|---|
| 10,053,088 | B1* | 8/2018 | Askeland | H04N 7/18 |
| 10,210,399 | B2* | 2/2019 | Sabeti | H04N 7/183 |
| 2008/0195284 | A1* | 8/2008 | Hammadou | G06K 9/00805 |
| | | | | 701/45 |
| 2010/0253597 | A1* | 10/2010 | Seder | G08G 1/165 |
| | | | | 345/7 |
| 2010/0268423 | A1* | 10/2010 | Breed | B60N 2/002 |
| | | | | 701/45 |
| 2010/0289632 | A1* | 11/2010 | Seder | G06K 9/00805 |
| | | | | 340/436 |
| 2010/0317420 | A1* | 12/2010 | Hoffberg | G06Q 30/0207 |
| | | | | 463/1 |
| 2012/0296567 | A1* | 11/2012 | Breed | G01C 21/26 |
| | | | | 701/468 |
| 2013/0116859 | A1* | 5/2013 | Ihlenburg | G06F 17/00 |
| | | | | 701/2 |
| 2017/0176188 | A1* | 6/2017 | Georgy | G01C 21/005 |
| 2017/0207543 | A1* | 7/2017 | Kirino | G01S 7/03 |
| 2017/0221325 | A1* | 8/2017 | Cruz-Hernandez | G08B 6/00 |
| 2017/0355307 | A1* | 12/2017 | Ha | G08G 1/143 |
| 2018/0126903 | A1* | 5/2018 | Herrmann | G06T 3/0018 |
| 2018/0284774 | A1* | 10/2018 | Kawamoto | G08G 1/16 |
| 2018/0334108 | A1* | 11/2018 | Rotzer | B60R 11/04 |
| 2018/0341263 | A1* | 11/2018 | Rust | G01S 13/874 |

* cited by examiner

INTELLIGENT ULTRASONIC SYSTEM AND REAR COLLISION WARNING APPARATUS FOR VEHICLE

CROSS-REFERENCES TO RELATED APPLICATIONS

The present application claims priority to Korean application numbers 10-2017-0095857, filed on Jul. 28, 2017, and 10-2017-0104683, filed on Aug. 18, 2017, which are incorporated by reference in their entirety.

BACKGROUND OF THE INVENTION

An aspect of the present invention relates to an intelligent ultrasonic system and a control method thereof, and more particularly, to an intelligent ultrasonic system which can reset a parameter of an ultrasonic sensor mounted on a vehicle in response to a surrounding environment, and a control method thereof. Another aspect of the present invention relates to a rear collision warning apparatus for a vehicle and a control method thereof, and more particularly, to a rear collision warning apparatus for a vehicle, which can not only calculate a collision risk index, but also generate a prefill braking pressure to prepare for emergency braking, based on weights for a plurality of sensors for sensing the rear of the vehicle and risk indexes of the plurality of sensors which sensed an obstacle, and a control method thereof.

In general, a front/back warning system for a vehicle refers to a system that generates a warning according to a result obtained by measuring a distance to an object at the front or back of the vehicle using an ultrasonic sensor as illustrated in FIG. 1, in order to prevent a collision accident between the object and the vehicle during parking or stopping.

At this time, the front/back warning system uses the ultrasonic sensor as a sensor for sensing a forward/backward object. In order to normally sense a forward/backward object from a signal sensed through the ultrasonic sensor, the front/back warning system must perform an initialization operation when the vehicle is started. The initialization operation (or initialization operation of the ultrasonic sensor) is an operation to set a kind of reference value (or parameter) for sensing only a signal reflected from the object while excluding a noise signal.

Such an initialization operation (initialization operation of the ultrasonic sensor) has been performed to correct differences in sensitivity among a plurality of ultrasonic sensors. However, the initialization operation may not correct a change in the overall sensing performance of the plurality of ultrasonic sensors depending on the surrounding environment (climate, humidity or weather).

Since at least several feedback processes are repeated during the initialization operation (or the initialization operation of the ultrasonic sensor), a considerable amount of time may be required until the sensing function of the ultrasonic system is normalized.

In general, various recognition methods are applied in order to recognize an obstacle around a vehicle. The various recognition methods may include a motion estimation method, a thing recognition method, a heterogeneous sensor fusion method and a method based on a cross region among cameras (hereafter, referred to as a cross region-based method).

The motion estimation method applies a complex motion estimation technique such as an optical flow, using the existing image processing technique, the existing monitoring cameras and the existing object tracking technique.

The thing recognition method recognizes a thing using an advanced learning technique such as pattern recognition.

The heterogeneous sensor fusion method recognizes a thing by fusing a detection result of a camera which serves to detect a moving object and a detection result of a radar, laser scanner or ultrasonic sensor which serves to detect a stationary obstacle.

The cross region-based method recognizes a thing from an image obtained by combining cross regions of images taken through a plurality of cameras at the same point of time.

As such, there are a variety of warning systems which detect an obstacle therearound through various methods, and not only warn a driver about the presence of the obstacle, but also determine a collision risk and warn the driver about the collision risk.

However, when an obstacle is detected through various methods, the detection reliability may differ depending on the methods or differ depending on the surrounding environments. Therefore, since the detection reliability may be degraded depending on a selected method, the reliability of the collision warning process may also be degraded.

The related arts of the present invention are disclosed in Korean Patent Publication No. 10-2001-0016962 published on Mar. 5, 2001 and entitled "Back warning method with sensor initialization function", and Korean Patent Registration No. 1734490 published on May 11, 2017 and entitled "AVM system using ultrasonic sensor and control method thereof".

SUMMARY OF THE INVENTION

Various embodiments of the present invention are directed to an intelligent ultrasonic system which can reset a parameter of an ultrasonic sensor mounted on a vehicle in response to a surrounding environment, and a control method thereof.

Also, various embodiments of the present invention are directed to a rear collision warning apparatus for a vehicle, which can not only calculate a collision risk index, but also generate a prefill braking pressure to prepare for emergency braking, based on weights for a plurality of sensors for sensing the rear of the vehicle and risk indexes of the plurality of sensors which sensed an obstacle, and a control method thereof.

In one embodiment, an intelligent ultrasonic system may include: a camera sensor unit configured to take an image of a road ahead of a driving vehicle; an ultrasonic signal input unit configured to receive an ultrasonic signal sensed through one or more ultrasonic sensors mounted on the vehicle; a feature extraction unit configured to extract a feature of the received ultrasonic signal in order to determine whether the ultrasonic signal is a noise signal or normal signal; a data collision unit configured to collect one or more data related to a surrounding situation of the road on which the vehicle is driven; and a control unit configured to divide the surrounding situation into two or more classes based on the one or more data related to the surrounding situation and collected through the data collection unit, and change or reset an existing parameter to a parameter corresponding to any one class of the classes when the surrounding situation corresponds to the one class or is changed to the one class.

In another embodiment, a control method of an intelligent ultrasonic system may include: constructing, by the intelligent ultrasonic system, a learning database, and extracting a feature vector from an ultrasonic signal inputted through an ultrasonic signal input unit; constructing, by the intelligent ultrasonic system, two or more classes for a surrounding situation into which temperature and humidity are reflected, and learning an optimal parameter corresponding to the surrounding situation through a machine learning algorithm based on each of the classes; generating, by the intelligent ultrasonic system, a machine learning classifier, when the optimal parameter learning process for each class based on the surrounding situation is performed; predicting, by the intelligent ultrasonic system, a class corresponding to the surrounding situation through the machine learning classifier, even when data related to the surrounding situation are not yet collected, after the machine learning classifier is generated; and applying, by the intelligent ultrasonic system, an optimal parameter corresponding to the predicted class to an ultrasonic sensor or preprocessing logic.

In another embodiment, a control method of an intelligent ultrasonic system may include: setting, by a control unit of the intelligent ultrasonic system, a basic parameter for the intelligent ultrasonic system or an ultrasonic sensor thereof, when a vehicle is started; collecting, by the control unit, wind information in real time, depending on a vehicle speed; predicting, by the control unit, a class corresponding to a surrounding environment through learning, and selecting a parameter optimized to the predicted class; and deciding and applying, by the control unit, a finally tuned parameter by reflecting a weight corresponding to the wind information to the selected parameter.

In another embodiment, a rear collision warning apparatus for a vehicle may include: a rear sensing unit configured to sense a rear obstacle of the vehicle through a plurality of sensors; a vehicle information input unit configured to receive vehicle information from a vehicle control unit; a control unit configured to calculate risk indexes for the rear obstacle based on the vehicle information received from the vehicle information input unit and results sensed through the plurality of sensors, when the rear obstacle is sensed through the rear sensing unit, decide weights according to the characteristics of the plurality of sensors, calculate a collision risk index for the rear obstacle based on the risk indexes and the weights, and generate a warning depending on the collision risk index and the characteristic of the rear obstacle; and a warning unit configured to output the warning generated through the control unit.

In another embodiment, a control method of a rear collision warning apparatus for a vehicle may include: deciding, by a control unit, weights according to characteristics of a plurality of sensors included in a rear sensing unit, when the vehicle is being reversed; sensing, by the control unit, a rear obstacle through the rear sensing unit; calculating, by the control unit, risk indexes based on vehicle information inputted from a vehicle information input unit and results sensed through the plurality of sensors, when the rear obstacle is sensed; calculating, by the control unit, a collision risk index for the rear obstacle, based on the risk indexes for the rear obstacle sensed by the rear sensing unit and the weights of the plurality of sensors; and determining, by the control unit, the collision risk index and the characteristic of the rear obstacle, and outputting a warning through a warning unit.

DESCRIPTION OF SPECIFIC EMBODIMENTS

Hereafter, an intelligent ultrasonic system and a control method thereof in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Typically, an ultrasonic sensor is affected by combinations of medium, climate, wind and the like, depending on its unique characteristic, the medium including a material to transmit ultrasonic pulses.

Therefore, sensor parameters optimized through a test in various environments have been selected for an ultrasonic sensor used for vehicles. However, with the gradual increase of DAS (Driver Assistance System) product groups, the sensor parameters need to be reset depending on the sensor environment, and sensor values used in an ultrasonic system need to be processed through different methods in many cases.

In order to cope with such a situation, an intelligent ultrasonic system is required, which can sense a surrounding environment, reset parameters of an ultrasonic sensor (or ultrasonic system) according to the surrounding environment, and efficiently process signals according to the reset parameters.

Figure 1:
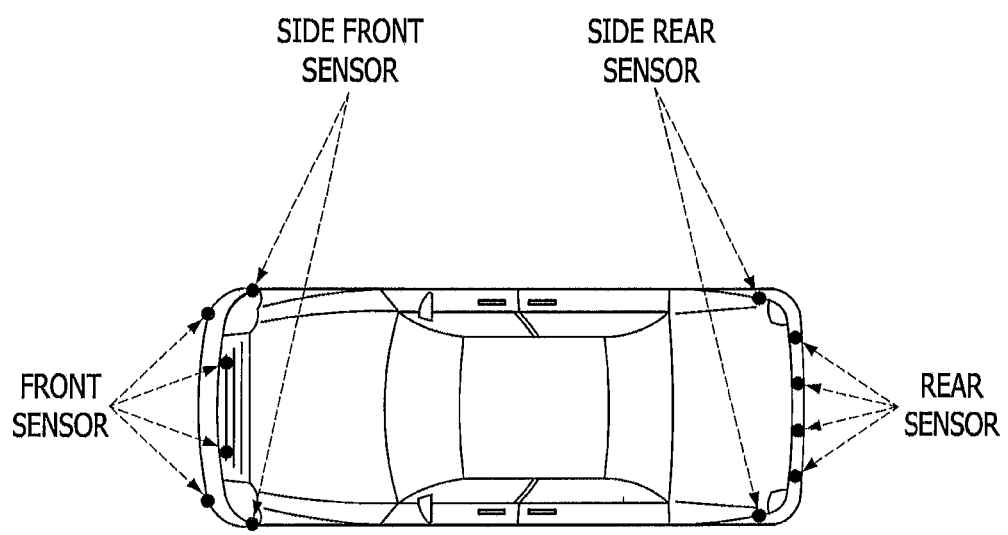
FIG. 1 illustrates a configuration of ultrasonic sensors applied to a general front/back warning system for a vehicle.
Figure 2:
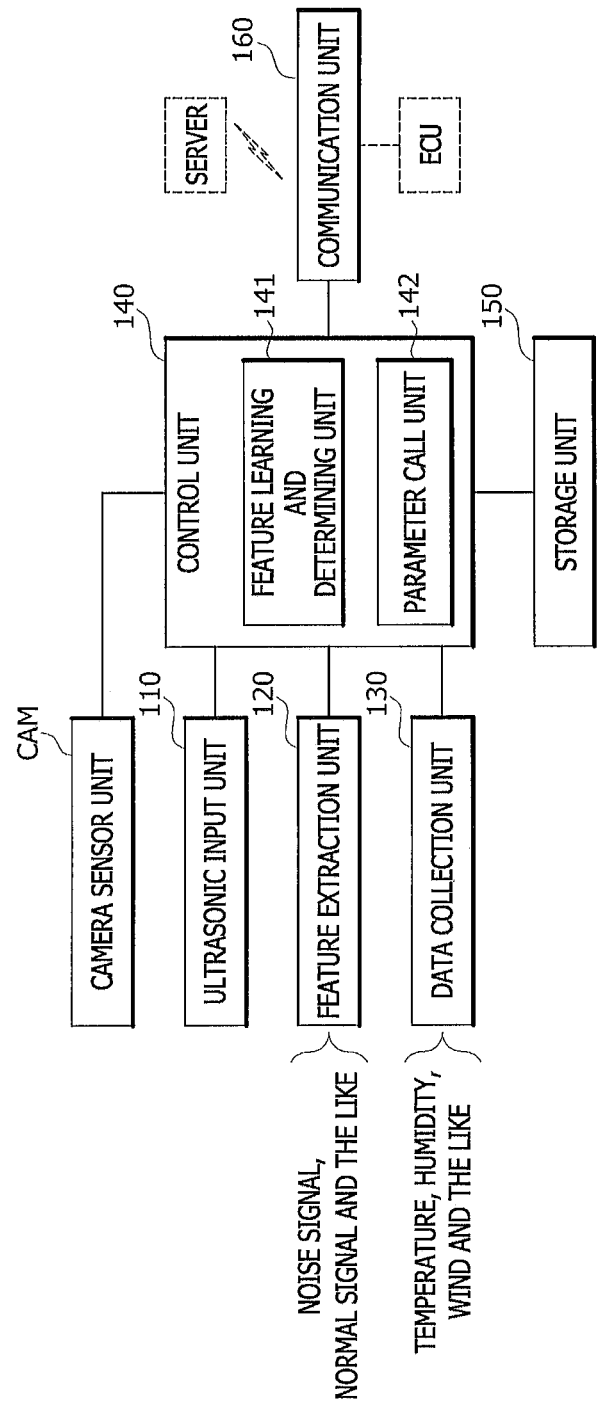
FIG. 2 is a block diagram illustrating a schematic configuration of an intelligent ultrasonic system in accordance with an embodiment of the present invention.

FIG. 2 is a block diagram illustrating a schematic configuration of an intelligent ultrasonic system in accordance with an embodiment of the present invention.

As illustrated in FIG. 2, the intelligent ultrasonic system in accordance with the present embodiment may include a camera sensor unit CAM, an ultrasonic signal input unit 110, a feature extraction unit 120, a data collection unit 130, a control unit 140, a storage unit 150 and a communication unit 160.

The camera sensor unit CAM may take a forward image (including a road) of a traveling vehicle, and transfer the forward image to the control unit 140, and the control unit 140 may determine the state of the road, and recognize a change in state of the road. Furthermore, the control unit 140 may set (or reset) parameters of the ultrasonic system (or ultrasonic sensor) in response to a change in state of the road (for example, a change of the surrounding environment).

The ultrasonic signal input unit 110 may receive an ultrasonic signal detected through one or more ultrasonic sensors (not illustrated) of a front/back warning system in the vehicle.

The ultrasonic signal input unit 110 needs to receive only an ultrasonic signal reflected from an object which is in front of an ultrasonic sensor and needs to be sensed. However, since the ultrasonic signal is widely radiated, the ultrasonic signal input unit 110 may receive an ultrasonic signal reflected from the road surface, a signal reflected from a medium, and an ultrasonic signal reflected at a predetermined angle in front.

Therefore, the ultrasonic signal reflected from the object in front of the ultrasonic sensor may become a normal signal, but the ultrasonic signal reflected from the road surface, the signal reflected from the medium and the ultrasonic signal reflected at the predetermined angle in front may become noise signals (i.e. noise ultrasonic signals).

Figure 3A:
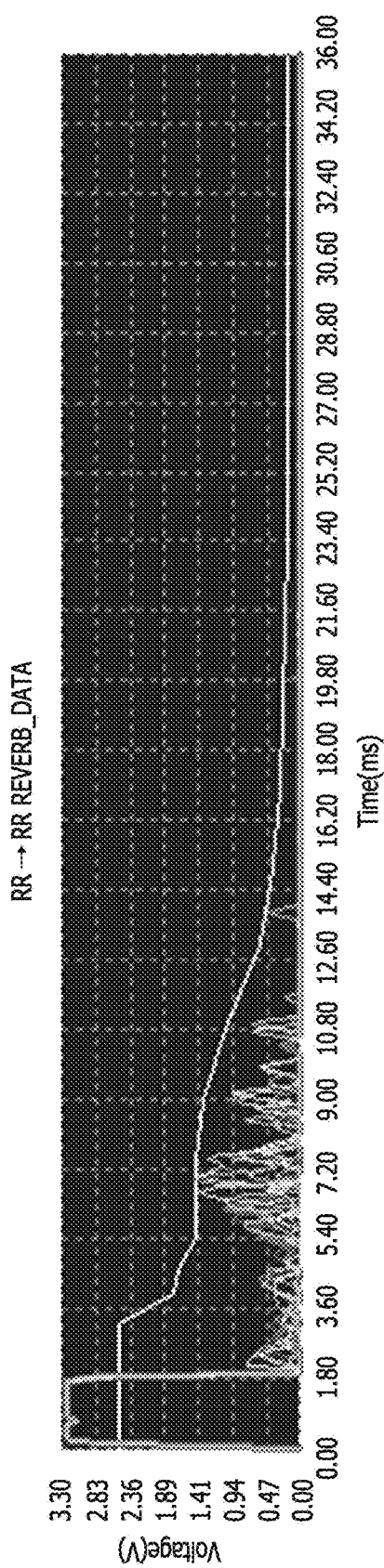
FIGS. 3A and 3B illustrate the waveforms of noise ultrasonic signals which are reflected from the road surface and inputted to the ultrasonic system, depending on the weather, in FIG. 2.
Figure 3B:
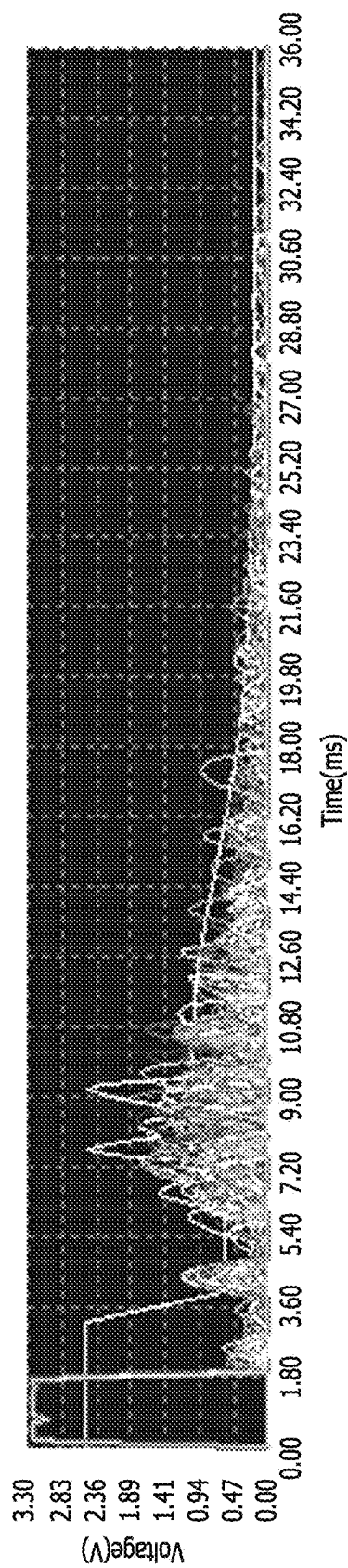

For reference, FIGS. 3A and 3B illustrate the waveforms of noise ultrasonic signals which are reflected from the road surface and inputted to the ultrasonic system, depending on the weather, in FIG. 2. FIGS. 3A and 3B show that the noise ultrasonic signals reflected from the road surface are changed depending on the weather.

That is, in case of rain, the number of noise ultrasonic signals exceeding a preset reference value (i.e. parameter or gain) may increase (refer to FIG. 3B), compared to the number of noise ultrasonic signals reflected from the road surface in case of a fine day (refer to FIG. 3A). Therefore, the reference value (or the parameter or gain) of the ultrasonic sensor needs to be reset depending on the surrounding situation, in order to stabilize the sensing performance.

The feature extraction unit 120 may extract the feature of the ultrasonic signal inputted through the ultrasonic signal input unit 110. That is, it is possible to determine whether the ultrasonic signal is a noise signal or normal signal, based on the extracted feature of the ultrasonic signal.

The data collection unit 130 may collect data related to the surrounding situation (for example, information such as wind, humidity and temperature).

The data collection unit 130 may collect (or predict) the data related to the surrounding situation (for example, information such as wind, humidity and temperature) from one or more sensors (for example, illumination sensor, humidity sensor and vehicle speed sensor) mounted in the vehicle through an electronic control unit (ECU), or collect the data related to the surrounding situation (for example, information such as wind, humidity and temperature) from an external server which provides weather information.

The data collection unit 130 may predict the strength of the wind using the vehicle speed sensor. For example, the strength of the wind may increase in response to the vehicle speed.

In order for the data collection unit 130 to collect the data related to the surrounding situation (for example, information such as wind, humidity and temperature), the intelligent ultrasonic system may further include a communication unit 160 for communication with the ECU or the external server.

The communication unit 160 may receive a road image through the camera sensor unit CAM (for example, a black box camera, a navigation camera or a camera installed in the vehicle) mounted in the vehicle through communication with the ECU, and the control unit 140 may determine whether the state of the road (or road surface) is changed, based on the road image.

The storage unit 150 may store the ultrasonic signal inputted through the ultrasonic signal input unit 110, and store the data related to the surrounding situation (for example, information such as wind, humidity and temperature), the data being collected through the data collection unit 130. Furthermore, the storage unit 150 may store a preset or learned parameter (for example, a parameter of the ultrasonic system or ultrasonic sensor), depending on the surrounding situation.

At this time, among the surrounding situation data (for example, information such as wind, humidity and temperature) collected by the data collection unit 130, the wind may be classified into N classes based on the strength, and the humidity may be classified into K classes. The N classes and the K classes are only examples. Furthermore, the temperature may be set to a temperature corrected into the actual temperature on the road, because the ambient temperature and the temperature on the road are different from each other. The temperature may be classified into P classes, like the wind or humidity. The P classes are also only an example.

In the present embodiment, when the parameter (a kind of reference value based on the surrounding situation) of the ultrasonic sensor is changed or reset depending on the surrounding situation, the control unit 140 may determine and learn the features of ultrasonic signals based on the surrounding situation through a feature learning and determination unit 141, i.e. the features of a noise signal and normal signal which are generated depending on the surrounding situation. When the surrounding situation is determined through a parameter call unit 142, the control unit 140 may call a parameter of the ultrasonic sensor, corresponding to the surrounding situation, from the storage unit 150, and change or reset the parameter (a kind of reference value based on the surrounding situation) of the ultrasonic sensor (or the ultrasonic system).

At this time, when the parameter is immediately changed or reset in response to a minute change of the surrounding situation, the stability may be rather degraded.

Therefore, the intelligent ultrasonic system in accordance with the present embodiment may set the surrounding situation to a plurality of classes, or construct a plurality of classes (or a kind of group) based on the surrounding situation into which the information such as temperature, humidity and wind is reflected. When the surrounding situation corresponds to any one class of the constructed classes or the class corresponding to the surrounding situation is changed, the intelligent ultrasonic system may change or reset the parameter to a parameter corresponding to the class, which makes it possible to further improve the stability of the ultrasonic system.

Figure 4:
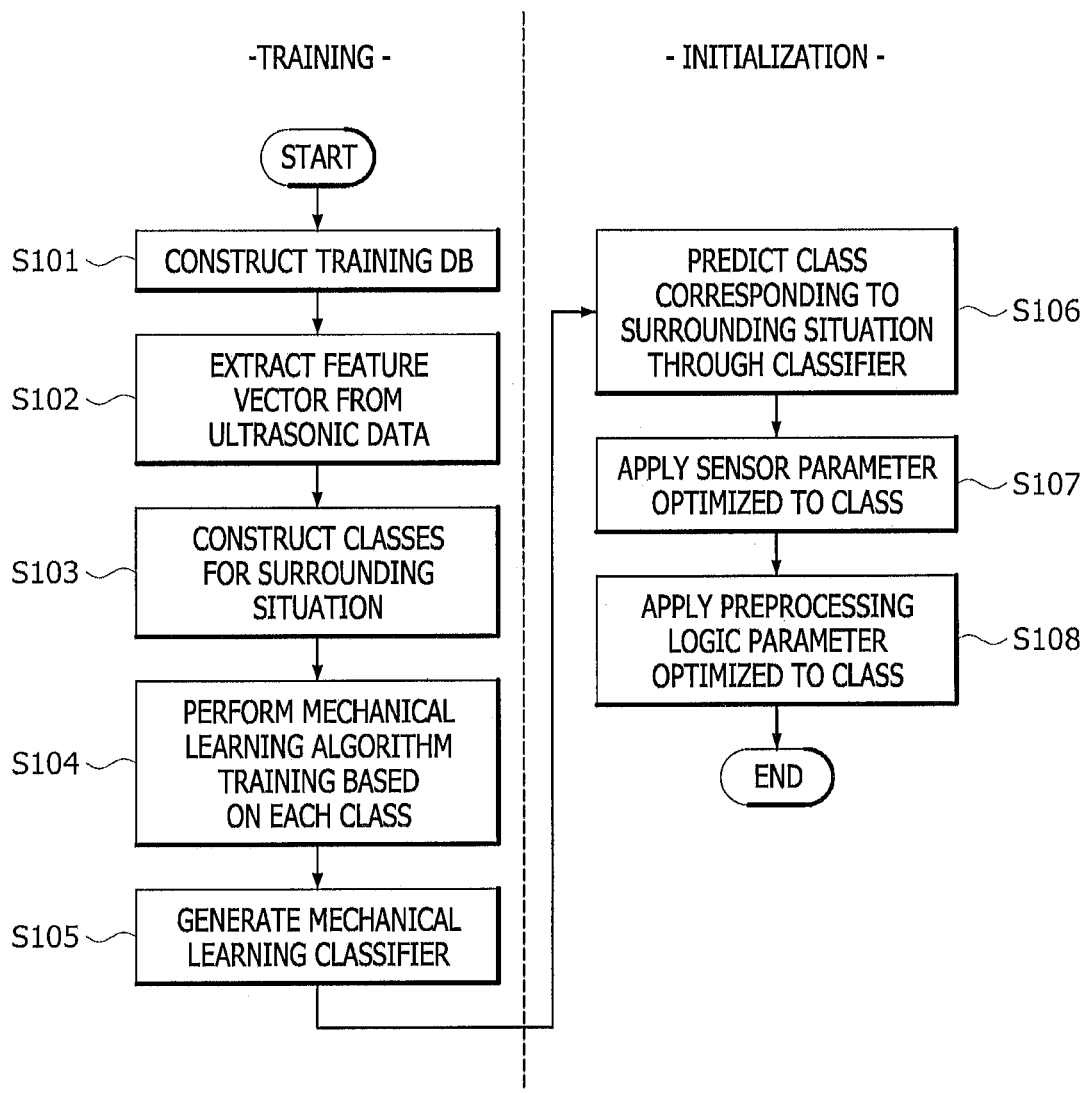
FIG. 4 is a flowchart illustrating a control method of an intelligent ultrasonic system in accordance with an embodiment of the present invention.

FIG. 4 is a flowchart illustrating a control method of the intelligent ultrasonic system in accordance with an embodiment of the present invention.

As illustrated in FIG. 4, the control method in accordance with the present embodiment may be divided into a training (learning) process and an initialization process. The control method may be divided into the training process and the initialization process, for convenience of description. However, the division may not indicate that the training process and the initialization process are performed separately from each other.

In order to perform the training process, the intelligent ultrasonic system in accordance with the present embodiment may construct a training database (DB) at step S101, and extract a feature vector from ultrasonic data inputted through the ultrasonic signal input unit 110 at step S102.

That is, the intelligent ultrasonic system may determine whether the ultrasonic data inputted through the feature extraction unit 120 is a noise signal or normal signal, in consideration of a normal distribution or statistics of values measured for a predetermined time.

The intelligent ultrasonic system in accordance with the present embodiment may construct (or set) two or more classes based on the surrounding situation into which temperature (or climate) and humidity or temperature, humidity and wind are reflected, at step S103, and learn (train) an optimal parameter corresponding to the surrounding situation according to a machine learning algorithm based on each of the classes, at step S104. The optimal parameter may include an optimal parameter for preventing a noise signal from being recognized as a normal signal.

When the optimal parameter learning process for each class based on the surrounding situation is performed, the intelligent ultrasonic system in accordance with the present embodiment may generate a machine learning classifier at step S105.

For example, the machine learning classifier may include a kind of algorithm for predicting the surrounding situation and deciding a class corresponding to the surrounding situation. When the ultrasonic system (or ultrasonic sensor) is initialized during a startup of the vehicle, the machine learning classifier may be used to reflect an elapse of time based on the previous surrounding situation when the vehicle was turned off, even though data related to the current surrounding situation is not still collected. The elapse of time may include an elapse of time until the vehicle is restarted after the vehicle was turned off for the last time, and the initialization of the ultrasonic system may indicate a process of setting a parameter for the surrounding situation which is predicted by reflecting the elapse of time. Therefore, the initialization time of the ultrasonic system (or ultrasonic sensor) can be shortened.

In other words, through the generation of the machine learning classifier, the intelligent ultrasonic system can reflect the elapse of time until the vehicle is restarted, based on the previous surrounding situation when the vehicle was turned off for the last time. Thus, even when data related to the current surrounding situation are not collected, the intelligent ultrasonic system can predict the surrounding situation as soon as the vehicle is started, and set a parameter for a class corresponding to the surrounding situation.

Therefore, a time required until the sensing function of the ultrasonic system is normalized (i.e. the initialization time) can be reduced.

When the generation of the machine learning classifier is completed, the intelligent ultrasonic system in accordance with the present embodiment may predict the class corresponding to the surrounding situation through the machine learning classifier, even though the data related to the surrounding situation are not yet collected, at step S106.

The intelligent ultrasonic system in accordance with the present embodiment may apply an optimal parameter corresponding to the predicted class to the ultrasonic sensor at step S107. The optimal parameter may include an optimal parameter corresponding to a kind of reference value for preventing a noise signal from being recognized as a normal signal.

The intelligent ultrasonic system may also apply the optimal parameter corresponding to the predicted class, i.e. the optimal parameter corresponding to a kind of reference value for preventing a noise signal from being recognized as a normal signal to preprocessing logic of the intelligent ultrasonic system at step S108.

In the present embodiment, it has been described that the optimal parameter for the ultrasonic sensor and the optimal parameter for the preprocessing logic are separately applied. However, the application of the optimal parameter may be understood as a process of setting (resetting) a kind of reference value (or parameter or gain) for excluding a noise signal from the input ultrasonic signal and recognizing only a normal signal, without distinguishing between the optimal parameters for the respective targets (for example, the ultrasonic sensor and the preprocessing logic).

Figure 5:
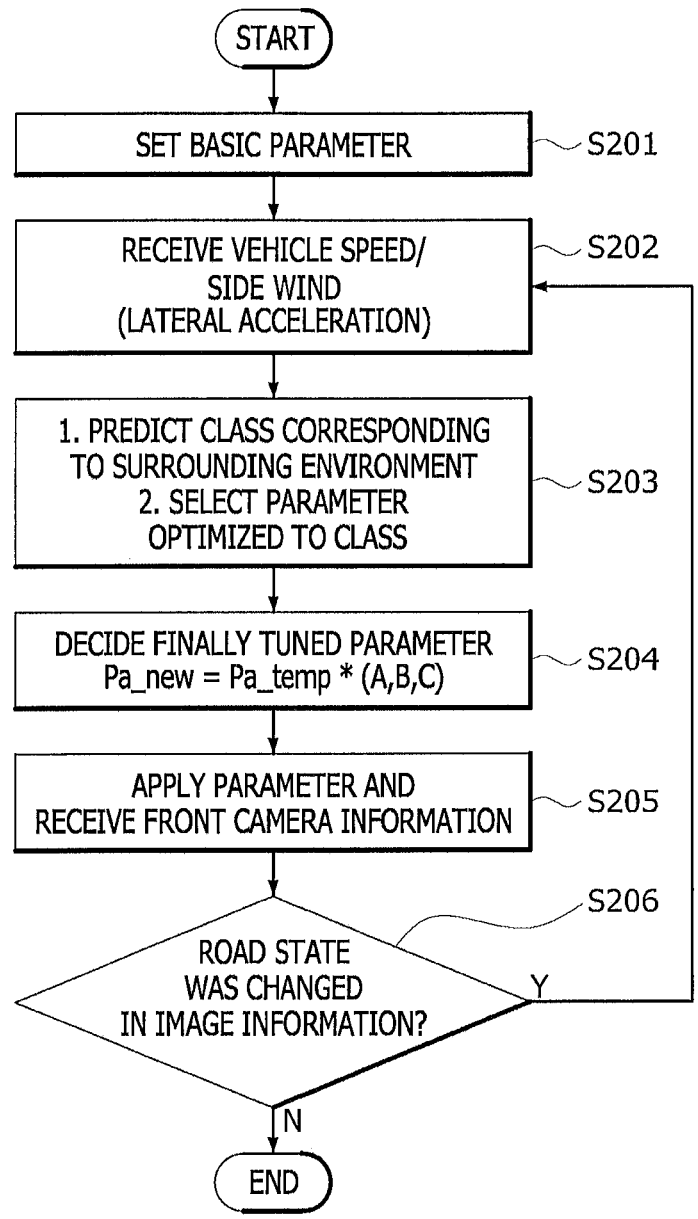
FIG. 5 is a flowchart illustrating a control method of an intelligent ultrasonic system in accordance with another embodiment of the present invention.

FIG. 5 is a flowchart illustrating a control method of an intelligent ultrasonic system in accordance with another embodiment of the present invention.

Referring to FIG. 5, when the vehicle is started, the control unit 140 may set a basic parameter of the ultrasonic system (or ultrasonic sensor) at step S201.

The basic parameter may include any one of a parameter set as a default parameter regardless of the surrounding environment and a parameter set through prediction of the surrounding environment as described with reference to FIG. 4.

The control unit 140 may receive (or collect) information on front wind and side wind (or lateral acceleration) from the ECU in real time, depending on the vehicle speed, at step S202.

For example, under the supposition that the front wind and side wind are divided into three groups (for example, A (0 to 20), B (21 to 30) and C (30 or more)) in advance, the control unit 140 may select a preset weight (for example, A=1.5, B=1.2 and C=1.1), i.e. a weight for parameter correction, according to the group to which the front wind and side wind belong.

The control unit 140 may predict a class corresponding to the surrounding environment through machine learning, and select a parameter Pa_temp optimized to the predicted class, at step S203.

The control unit 140 may decide the finally tuned parameter Pa_new (=Pa_temp*(A, B, C)) by reflecting the weight (for example, A=1.5, B=1.2 and C=1.1) based on the wind (for example, the front wind or side wind) into the selected parameter Pa_temp.

The control unit 140 may apply the finally tuned parameter Pa_new (=Pa_temp*(A, B, C)), and receive front camera information from the camera sensor unit CAM at step S205. Then, the control unit 140 may check whether the road state was changed in the image information, at step S206.

When the check result indicates that the road state was changed (Y at step S206), the control unit 140 may repeat the process of predicting a class corresponding to the surrounding environment, and deciding the finally tuned parameter optimized to the predicted class (S202 to S206). That is, when the road state was changed, the control unit 140 may easily determine that the surrounding environment was changed.

When the check result indicates that the road state was not changed (N at step S206), the control unit 140 may maintain the current state until the road state is changed.

In the present embodiment, the parameter of the ultrasonic sensor mounted in the vehicle can be reset in response to the surrounding environment, which makes it possible to shorten the time required for normalizing the sensing function of the ultrasonic system, while improving the sensing performance in response to the surrounding environment.

Figure 6:
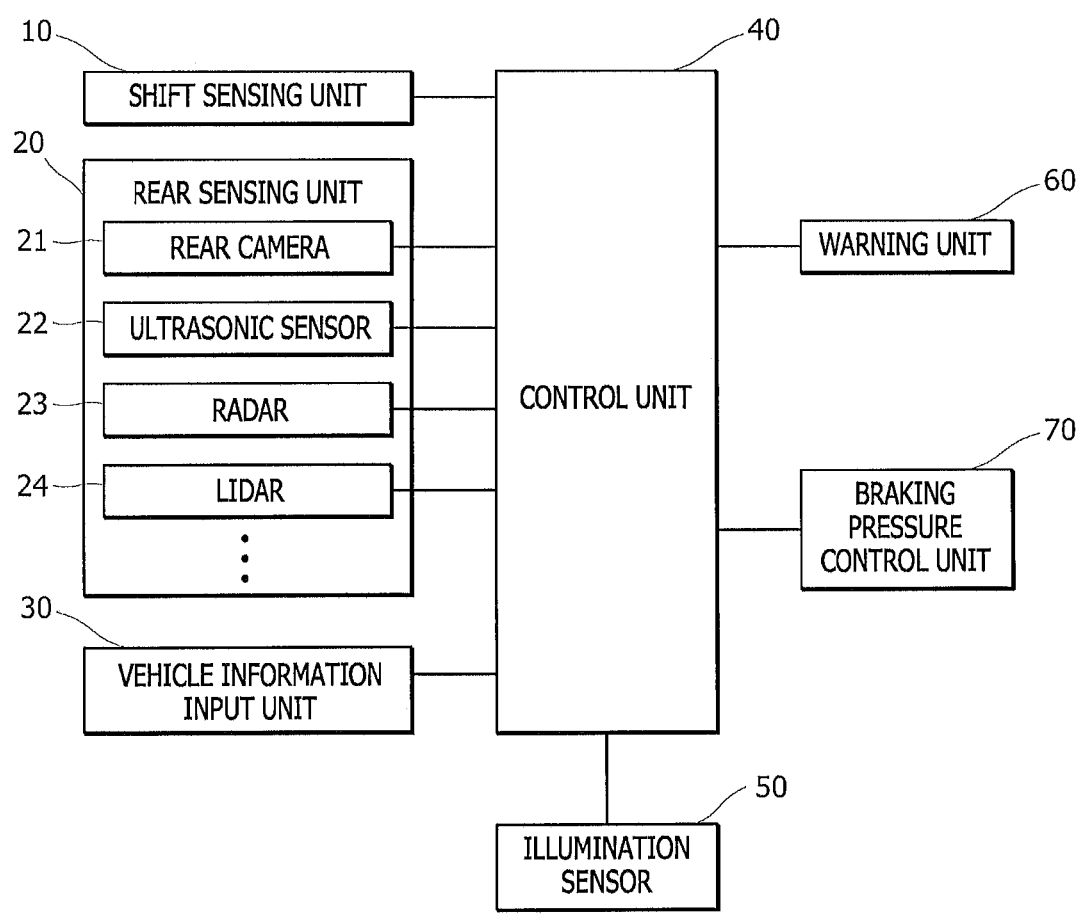
FIG. 6 is a block diagram illustrating a rear collision warning apparatus for a vehicle in accordance with another embodiment of the present invention.

FIG. 6 is a block diagram illustrating a rear collision warning apparatus in accordance with another embodiment of the present invention.

As illustrated in FIG. 6, the rear collision warning apparatus in accordance with the embodiment of the present invention may include a shift sensing unit 10, a rear sensing unit 20, a vehicle information input unit 30, an illumination sensor 50, a control unit 40 and a warning unit 60.

The shift sensing unit 10 may sense a shift lever position of the vehicle, and provide the sensed shift lever position to the control unit 40, such that the control unit 40 can determine whether the vehicle is being reversed.

The rear sensing unit 20 may sense an obstacle at the rear of the vehicle through a plurality of sensors, and provide the sensing information to the control unit 40.

The plurality of sensors may include at least an ultrasonic sensor 22 and a rear camera 21. In addition, the plurality of sensors may include various sensors such as a radar 23 and a LiDAR (Light Detection and Ranging) 24, which can sense an obstacle therearound.

The plurality of sensors may be installed at various positions to sense the rear obstacle at various angles, and thus remove the sensing dead zone while increasing the sensing reliability.

The vehicle information input unit 30 may receive vehicle information from a vehicle control unit (not illustrated) and provide the received information to the control unit 40.

The vehicle information received from the vehicle information input unit 30 may include one or more of a vehicle speed, steering angle and yaw rate. The vehicle information may be reflected when risk indexes are calculated after the rear obstacle is sensed.

The illumination sensor 50 may sense surrounding brightness and provide the sensed brightness to the control unit 40. The brightness may be reflected when the control unit 40 decides a weight of the sensor.

In particular, since the rear camera 21 of the rear sensing unit 20 has a significant difference in sensing reliability depending on the surrounding brightness, the surrounding brightness may serve as an important variable when the weight is decided.

The control unit 40 may determine whether the vehicle is being reversed, through the shift sensing unit 10, and sense a rear obstacle through the rear sensing unit 20 when the vehicle is being reversed. When the rear obstacle is sensed, the control unit 40 may calculate risk indexes for the rear obstacle, based on the vehicle information inputted from the vehicle information input unit 30 and the results sensed through the plurality of sensors.

The control unit 40 may decide weights for the plurality of sensors according to the surrounding brightness sensed through the illumination sensor 50 and the characteristics of the sensors, calculate a collision risk index for the rear obstacle based on the risk indexes and the weights, and generate a warning depending on the collision risk index and the characteristic of the rear obstacle.

The control unit 40 may determine the characteristic of the rear obstacle. When it is determined that the rear obstacle is a moving object, the control unit 40 may calculate a prefill braking pressure according to the collision risk index, and output the calculated prefill braking pressure to the braking pressure control unit 70.

When the rear obstacle is a moving object such as a pedestrian or animal, the rear obstacle may suddenly approach the vehicle. Therefore, the control unit 40 may output the calculated prefill braking pressure to the braking pressure control unit 70, and the braking pressure control unit 70 may generate the prefill braking pressure such that braking is smoothly performed in case of emergency braking.

The control unit 40 may change warning voice depending on the collision risk index, when generate a warning.

The risk index may be defined as a function including one or more of the size, position, speed and acceleration of the rear obstacle, which are sensed through the plurality of sensors, and one or more of the vehicle speed, steering angle and yaw rate which are the vehicle information.

The collision risk index may be calculated by multiplying the risk indexes for the rear obstacle, calculated through the respective sensors, by the weights of the sensors and adding up the multiplication results, in order to fuse the results sensed through the sensors of the rear sensing unit 20.

The warning unit 60 may output the warning generated by the control unit 40, such that a driver can recognize the sensed rear obstacle.

As described above, the rear collision warning apparatus for a vehicle in accordance with the embodiment of the present invention can calculate the collision risk index based on the weights for the plurality of sensors for sensing the rear of the vehicle and the risk indexes of the plurality of sensors which sensed the rear obstacle, and warn the driver about the collision risk, thereby increasing the sensing reliability. Furthermore, when the rear obstacle is a moving object, the rear collision warning apparatus can generate a prefill braking pressure to prepare for emergency braking, thereby preventing a collision with the rear obstacle.

Figure 7:
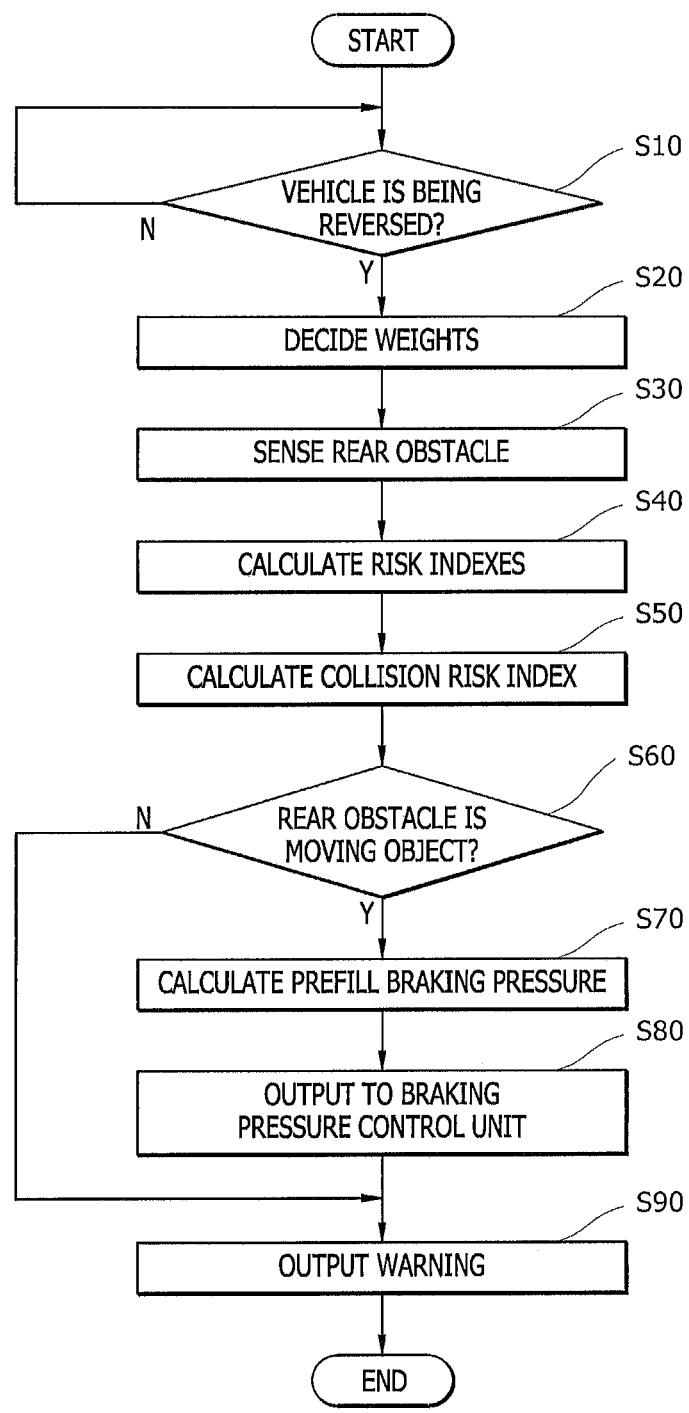
FIG. 7 is a flowchart illustrating a control method of a rear collision warning apparatus for a vehicle in accordance with the embodiment of the present invention.

FIG. 7 is a flowchart illustrating a control method of a rear collision warning apparatus in accordance with another embodiment of the present invention.

As illustrated in FIG. 7, the control method of the collision warning apparatus in accordance with the embodiment of the present invention may start with step S10 in which the control unit 40 determines whether the vehicle is being reversed, based on the state of the shift sensing unit 10, at step S10.

The control unit 40 may determine whether the position of the shift lever is at 'R', through the shift sensing unit 10, in order to determine whether the vehicle is being reversed. The control unit 40 may determine whether the vehicle is being reversed, based on the vehicle information.

When it is determined at step S10 that the vehicle is not being reversed, the control unit 40 may continuously determine whether the vehicle is being reversed. When it is determined that the vehicle is being reversed, the control unit 40 may decide weights depending on surrounding brightness sensed through the illumination sensor 50 and the characteristics of the plurality of sensors in the rear sensing unit 20, at step S20.

The rear sensing unit 20 may include at least the ultrasonic sensor 22 and the rear camera 21. In addition, the rear sensing unit 20 may include various sensors such as the radar 23 and the LiDAR 24, which can sense an obstacle therearound.

At this time, the plurality of sensors may be installed at various positions to sense the rear obstacle at various angles, and remove the sensing dead zone, thereby increasing the sensing reliability.

When the weights are decided at step S20, the control unit 40 may turn on the ultrasonic sensor 22 of the rear sensing unit 20 in order to monitor noise. When noise is equal to or more than a preset value, the control unit 40 may set the weight of the ultrasonic sensor 22 to a lower value than the basic weight.

When the surrounding brightness received from the illumination sensor 50 is high, the control unit 40 may set the weight of the rear camera 21 to a higher value than the basic weight. On the other hand, when the surrounding brightness is low, the control unit 40 may set the weight of the ultrasonic sensor 22 to a higher value than the basic weight.

After operating the rear sensing unit 20 at step S20, the control unit 40 may sense the rear obstacle through the plurality of sensors of the rear sensing unit 20 at step S30.

When the rear obstacle is sensed at step S30, the control unit 40 may calculate risk indexes based on the vehicle information inputted from the vehicle information input unit 30 and the results sensed through the plurality of sensors, at step S40.

The risk index may be defined as a function including one or more of the size, position, speed and acceleration of the rear obstacle, which are sensed through the plurality of sensors, and one or more of the vehicle speed, steering angle and yaw rate which are the vehicle information.

After calculating the risk index at step S40, the control unit 40 may calculate a risk collision index for the rear obstacle by combining the results sensed through the plurality of sensors, at step S50.

That is, the plurality of sensors of the rear sensing unit 20 may be installed at various positions, and sense the rear obstacle at various angles, according to the characteristics of the respective sensors.

For example, when a small stone is sensed as the rear obstacle, the small stone may be recognized as an obstacle through the ultrasonic sensor 22, and the corresponding risk index may be calculated as a high value. However, since the small stone does not reach the bumper of the vehicle from the viewpoint of the rear camera 21, the corresponding risk index may be calculated as a low value.

Therefore, the collision risk index may be calculated by multiplying the risk indexes for the rear obstacle, calculated through the respective sensors, by the weights of the sensors and adding up the multiplication results, in order to fuse the results sensed through the sensors in the rear sensing unit 20.

After calculating the collision risk index for the rear obstacle at step S50, the control unit 40 may determine the characteristic of the sensed rear obstacle, and determine whether the rear obstacle is a moving object, at step S60.

When it is determined at step S60 that the rear obstacle is not a moving object but a stationary object, the control unit 40 may output a warning through the warning unit 60 depending on the collision risk index, at step S90.

That is, when the collision risk index is high, the control unit 40 may increase the volume of the warning sound, and raise the tempo of the warning sound.

On the other hand, when it is determined at step S60 that the rear obstacle is a moving object such as a pedestrian or animal, the control unit 40 may calculate a prefill braking pressure according to the collision risk index, in order to prepare for emergency braking, at step S70.

Then, the control unit 40 may output the prefill braking pressure calculated at step S70 to the braking pressure control unit 70, and prevent a collision through a rapid braking operation when an emergency braking situation occurs.

After outputting the prefill braking pressure to the braking pressure control unit 70 at step S80, the control unit 40 may output a warning through the warning unit 60 depending on the collision risk index, at step S90.

As described above, the control method of the rear collision warning apparatus for a vehicle in accordance with the embodiment of the present invention can calculate the collision risk index based on the weights for the plurality of sensors for sensing the rear of the vehicle and the risk indexes of the plurality of sensors which sensed the rear obstacle, and warn the driver about the collision risk, thereby increasing the sensing reliability. Furthermore, when the rear obstacle is a moving object, the control method can generate a prefill braking pressure to prepare for emergency braking, thereby preventing a collision with the rear obstacle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An ultrasonic system of a vehicle comprising:
   a camera sensor unit configured to take an image of a road outside a vehicle;
   an ultrasonic signal input unit configured to receive at least a signal from one or more ultrasonic sensors mounted on the vehicle;
   a feature extraction unit configured to extract a feature of the received signal;
   a data collection unit configured to collect one or more data on at least one of wind, temperature and humidity;
   a storage device configured to store a plurality of sensor setting parameters for setting the one or more ultrasonic sensors; and
   a sensor control unit configured to set the one or more ultrasonic sensors with one of the sensor setting parameters that is determined based on one of vehicle surrounding classes;
   wherein, when the vehicle is driving, the sensor control unit is configured to:
      process the one or more data from the data collection unit to determine one of the vehicle surrounding classes based on the one or more data received from the data collection unit, and
      set the one or more ultrasonic sensors with one of the sensor setting parameters that corresponds to the vehicle surrounding class determined while the vehicle is driving,
   wherein, when the vehicle starts from the vehicle's turned off state, the sensor control unit is configured to:
      determine one of the vehicle surrounding classes based on the one or more data previously collected when the vehicle is turned off and further based on a time period between the vehicle's turning off and the vehicle's start without collecting data on at least one of wind, temperature and humidity at the time of the vehicle's start, and
      set the one or more ultrasonic sensors with one of the sensor setting parameters corresponding to the vehicle surrounding class determined at the time of the vehicle's start.

2. The ultrasonic system of claim 1, wherein the one or more data are collected from one or more sensors mounted in the vehicle through communication with an electronic control unit (ECU), or collected through communication with an external server which provides weather information.

3. The ultrasonic system of claim 1, wherein the sensor control unit processes the road image received through the camera sensor unit, determines whether the surrounding environment is changed, by recognizing a change in state of the road, and resets the parameter of the ultrasonic system according to the surrounding environment, when the surrounding environment is changed.

4. The ultrasonic system of claim 1, wherein the storage unit is configured to store one or more of the ultrasonic signal inputted through the ultrasonic signal input unit, the one or more data related to the surrounding situation and collected through the data collection unit, and the parameter of the ultrasonic sensor, which is preset or learned depending on the surrounding situation.

5. The ultrasonic system of claim 1, wherein the sensor control unit determines and learns the features of a noise signal and normal signal which are generated depending on the surrounding situation, calls a parameter corresponding to the surrounding situation from the storage unit, and changes or resets the parameter of the ultrasonic sensor or the ultrasonic system.

6. A control method of operating the ultrasonic system of claim 1, comprising:
    constructing, by the ultrasonic system, a learning database, and extracting a feature vector from a signal from an ultrasonic signal input unit;
    constructing, by the ultrasonic system, two or more classes for a surrounding situation into which temperature and humidity are reflected, and learning an optimal parameter corresponding to the surrounding situation through a machine learning algorithm based on each of the vehicle surrounding classes;
    generating, by the ultrasonic system, a machine learning classifier, when the optimal parameter learning process for each class based on the surrounding situation is performed;
    predicting, by the ultrasonic system, a class corresponding to the surrounding situation through the machine learning classifier, even when data related to the surrounding situation are not yet collected, after the machine learning classifier is generated; and
    applying, by the ultrasonic system, an optimal parameter corresponding to the predicted class to an ultrasonic sensor or preprocessing logic.

7. A control method of operating the ultrasonic system of claim 1, comprising:
    setting, by the sensor control unit of the ultrasonic system of claim 1, a basic parameter for the ultrasonic system or an ultrasonic sensor thereof, when a vehicle is started;
    collecting, by the sensor control unit, wind information in real time, depending on a vehicle speed;
    predicting, by the sensor control unit, a class corresponding to a surrounding environment through learning, and selecting a parameter optimized to the predicted class; and
    deciding and applying, by the sensor control unit, a finally tuned parameter by reflecting a weight corresponding to the wind information to the selected parameter.

8. The control method of claim 7, further comprising:
    receiving, by the sensor control unit, image information from a camera sensor unit of the system, and checking whether a road state was changed in the image information;
    repeating, by the sensor control unit, the process of collecting wind information and deciding a finally tuned parameter based on the surrounding environment, when the check result indicates that the road state was changed; and
    maintaining, by the sensor control unit, the current state until the road state is changed, when the check result indicates that the road state is not changed.

9. The control method of claim 7, wherein the wind information is divided into a plurality of groups depending on the strength of wind, and
    a weight for parameter correction is preset for each of the groups.

10. A rear collision warning apparatus for a vehicle, comprising:
    the system of claim 1 comprising a rear sensing unit configured to sense a rear obstacle of the vehicle through a plurality of sensors that comprises the camera and the ultrasonic sensor;
    a vehicle information input unit configured to receive vehicle information from a vehicle control unit;
    a collision warning control unit configured to calculate risk indexes for the rear obstacle based on the vehicle information received from the vehicle information input unit and results sensed through the plurality of sensors, when the rear obstacle is sensed through the rear sensing unit, decide weights according to the characteristics of the plurality of sensors, calculate a collision risk index for the rear obstacle based on the risk indexes and the weights, and generate a warning depending on the collision risk index and the characteristic of the rear obstacle; and
    a warning unit configured to output the warning generated through the collision warning control unit.

11. The rear collision warning apparatus of claim 10, wherein the collision warning control unit determines the characteristic of the rear obstacle, and calculates a prefill braking pressure depending on the collision risk index and outputs the calculated prefill braking pressure to a braking pressure control unit, when it is determined that the rear obstacle is a moving object.

12. The rear collision warning apparatus of claim 10, wherein the collision warning control unit changes a warning voice depending on the collision risk index, when generating the warning.

13. The rear collision warning apparatus of claim 10, wherein the risk index is calculated based on one or more of the size, position, speed and acceleration of the rear obstacle.

14. A control method of operating the rear collision warning apparatus of claim 10, the method comprising:
    deciding, by the collision warning control unit of the rear collision warning apparatus, weights according to characteristics of a plurality of sensors included in a rear sensing unit, when the vehicle is being reversed;
    sensing, by the collision warning control unit, a rear obstacle through the rear sensing unit;
    calculating, by the collision warning control unit, risk indexes based on vehicle information inputted from a vehicle information input unit and results sensed through the plurality of sensors, when the rear obstacle is sensed;
    calculating, by the collision warning control unit, a collision risk index for the rear obstacle, based on the risk indexes for the rear obstacle sensed by the rear sensing unit and the weights of the plurality of sensors; and
    determining, by the collision warning control unit, the collision risk index and the characteristic of the rear obstacle, and outputting a warning through a warning unit.

15. The control method of claim 14, wherein in the outputting of the warning, the collision warning control unit changes a warning voice depending on the collision risk index.

16. The control method of claim 14, further comprising calculating, by the collision warning control unit, a prefill braking pressure depending on the collision risk index and outputting the calculated prefill braking pressure to a braking pressure control unit, when it is determined that the rear obstacle is a moving object.

17. The control method of claim 14, wherein in the calculating of the risk indexes, the collision warning control unit calculates the risk indexes based on any one or more of the size, position, speed and acceleration of the rear obstacle, sensed through the plurality of sensors.

18. The control method of claim 14, wherein the rear sensing unit comprises the ultrasonic sensor and the camera of the ultrasonic system,
   wherein the deciding of the weights comprises:
   monitoring, by the collision warning control unit, noise of the ultrasonic sensor; and
   setting, by the collision warning control unit, the weight of the ultrasonic sensor to a lower value than a basic weight, when the noise of the ultrasonic sensor is equal to or more than a preset value.

19. The control method of claim 18, wherein in the deciding of the weights, the collision warning control unit sets the weight of the rear camera to a higher value than the basic weight when surrounding brightness is high, and sets the weight of the ultrasonic sensor to a higher value than the basic weight when the surrounding brightness is low.

* * * * *